June 8, 1943.  C. P. POND  2,321,239
SPARE TIRE AND LUGGAGE COMPARTMENT FOR VEHICLE BODIES
Original Filed Jan. 4, 1936  2 Sheets-Sheet 1

INVENTOR
Clarke P. Pond
BY John P. Tarbox
ATTORNEY

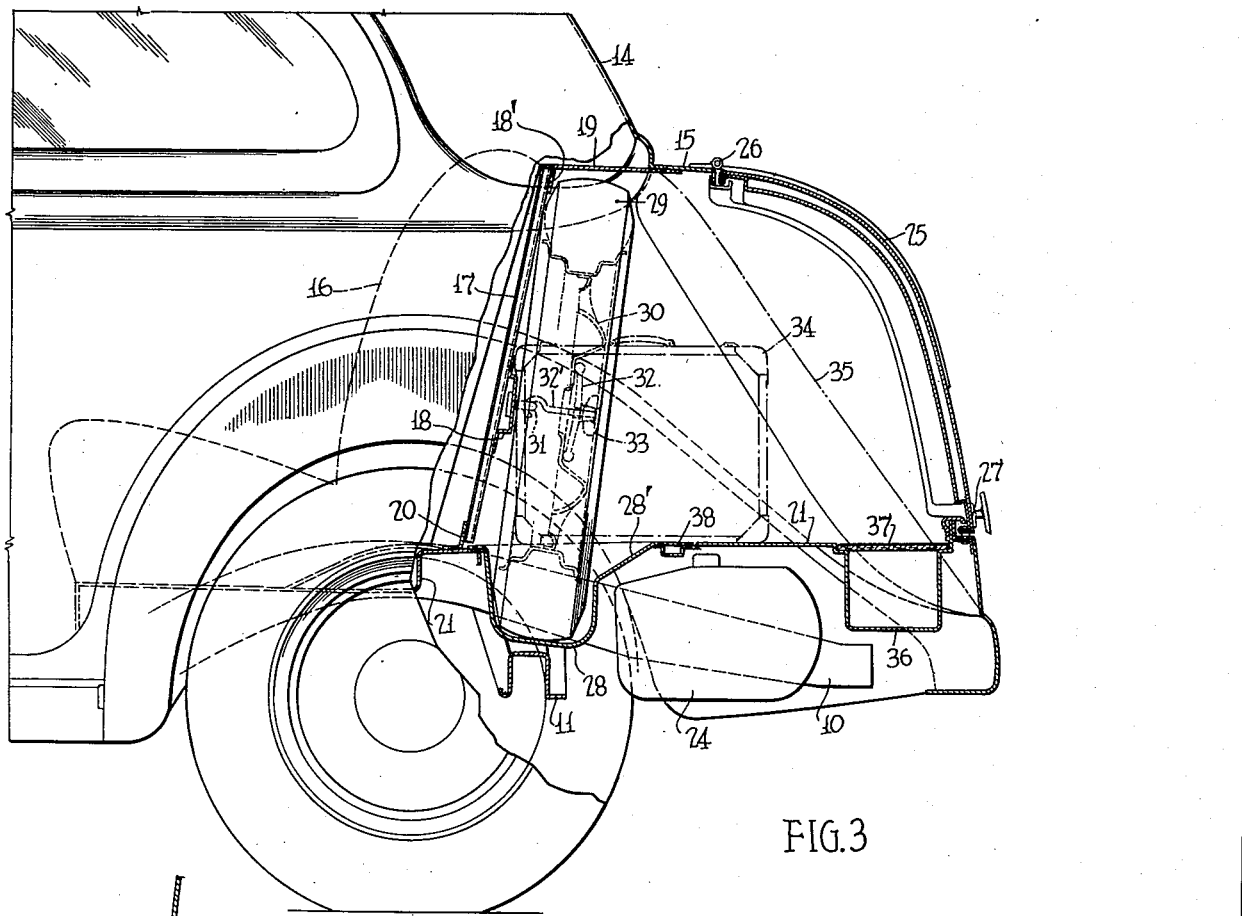

Patented June 8, 1943

2,321,239

UNITED STATES PATENT OFFICE 2,321,239

SPARE TIRE AND LUGGAGE COMPARTMENT FOR VEHICLE BODIES

Clarke P. Pond, Philadelphia, Pa., assignor to Edward G. Budd Manufacturing Company, Philadelphia, Pa., a corporation of Pennsylvania Continuation of application Serial No. 310,732, December 23, 1939, which was a continuation of application Serial No. 57,496, January 4, 1936. This application August 1, 1941, Serial No. 405,108

4 Claims. (Cl. 296—37)

The invention relates to vehicle bodies and more particularly to the spare tire and luggage compartment arranged at one end of a sedan type of such body. This application is a continuation of my copending application Serial No. 310,732, filed December 23, 1939, which was a continuation of my application Serial No. 57,496, filed January 4, 1936, both applications now abandoned.

Among the objects of the invention are ease of accessibility to the compartment without disturbing the occupants of the vehicle; ease of locating and securing the spare tire in the compartment and its similar easy removal therefrom, and the arrangement of the spare tire in the compartment so as to provide the maximum of room in the compartment for the storage of luggage and in such relation to the rest of the compartment as to permit the ready storage and removal of the luggage.

These objects are in large measure attained by an arrangement which utilizes the space of the luggage compartment to the best advantage. To afford easy access, the compartment is provided with a generous sized opening extending from the belt line to substantially the floor of the compartment and from adjacent one side of the body to the other. The spare tire is located in upright position flanking one of the upright walls of the compartment, and its lower portion may be received in a well provided in the bottom of the compartment. By this arrangement, the tire interferes least with the storage and removal of luggage and provides the maximum room in the compartment to receive such luggage. Additional storage space, as for the reception of tools, may be provided by a downwardly offset tool box extending below the floor along the lower margin of the opening of the compartment which box may be closed by a removable floor board continuous with the floor of the remainder of the compartment.

These and other objects and advantages and the manner in which they are attained will become more fully apparent from the detailed description following when read in connection with the drawings forming a part of this specification. In the drawings, Fig. 1 is a three-quarter perspective view of the rear of an automobile body equipped with the invention showing the spare tire in place and the cover of the compartment in open position.

Fig. 3 is a fragmentary central longitudinal vertical sectional view through the compartment with the cover closed.

Fig. 4 is a fragmentary transverse vertical sectional view through the compartment in rear of the tire receiving well, only the left hand part of the compartment being shown in this figure.

Figure 1:
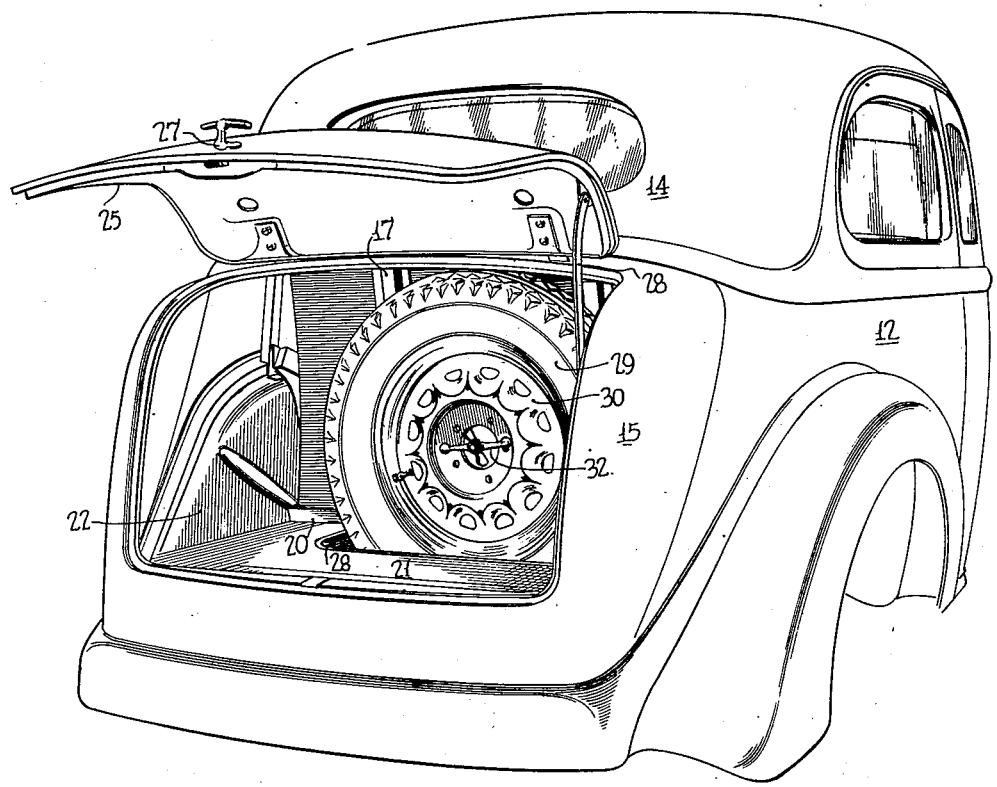

The invention as illustrated in the accompanying drawings is applied to a sheet metal body construction, a construction which lends itself most readily to the realization of its objects. In these drawings, the chassis sills upon which the body is supported are indicated at 10, a cross brace interconnecting these sills is indicated by 11, Fig. 3, the body side walls are indicated generally by numerals 12 and 13, the rear wall which slopes downwardly and rearwardly and merges by smooth rounded rear quarters into the side walls is designated by numeral 14, and the trunk housing forming a part of the rear body wall below the belt line has its portion forming parts of the top wall and of the side walls of the storage compartment designated by the numeral 15 and 15' respectively.

The rear seat structure forming the front wall of the storage compartment is designated generally by the reference numeral 16 and is offset at the top some distance forwardly of the rear wall 14 of the body structure. It comprises spaced upwardly extending flanged channel members as 17 which are interconnected by transversely extending flanged channel member 18 provided for a purpose to be presently described. At the tops these vertically extended members 17 are secured to a downwardly extending flange 18' at the forward end of a horizontally extending transverse panel 19 forming the forward portion of the top wall of the storage compartment, the rear edge of said panel being secured through an overlapped relation with the rear wall 14 of the body proper and the upper wall portion 15 of the luggage compartment.

The members 17 are inclined downwardly and forwardly to conform to the inclination of the seat back and are secured bottom to one arm of an angle member 20, the other arm of which is secured to the flooring 21. The flooring 21 may be a single plate extending from side to side of the body and secured to the wheel housing portions 22 of the side walls 12 and 13 through edge flanges as 23 overlapping and spot welded to the wheel housing. At the front this flooring plate 21 is downwardly offset and connected to the forwardly extending portion of the body flooring (not shown). The main portion of the flooring plate 21 is offset upwardly from the lower side and rear edges of the body as clearly appears in Figs. 3 and 4, a distance sufficient to receive the gasoline tank 24 in its usual location between chassis side sills and above the lower edge of the side and rear walls of the body.

A generous sized opening is formed in the rearwardly projecting trunk housing portion 15, 15' of the rear wall of the body, this opening being normally closed by a cover 25, this cover being hinged at the top through the hinges indicated at 26 and latched at the bottom through the latch indicated at 27. The cover may be held in open position as indicated in Fig. 1 by a collapsible brace 28 or other suitable means.

The top margin of this opening is substantially in the plane of the panel 19 forming the forward portion of the top of the compartment, the bottom margin of the opening is but slightly above the floor or compartment bottom 21, and laterally the opening extends substantially from one side wall of the trunk housing portion of the wall to the other side. As clearly appears in Figs. 1 and 2, this provides a means of ready access to the storage compartment which is thus substantially bounded at the front by the rear seat wall, at the sides by the wheel housings 22, portions of the side walls 12, 13 of the body and the side walls 15' of the trunk housing, at the rear and top by the panel 19, the top wall 15 of the trunk housing and the cover 25, and at the bottom by the floor plate 21.

The depth of the storage compartment would often be insufficient to receive the spare tire in an upright position especially where the floor plate is so offset above the lower edge of the body to receive the gasoline tank between the side walls of the body and above their lower edges. To take care of this, the present invention provides in the floor 21 of the compartment at the location designated for the spare tire a well 28 conforming generally to the shape and adapted to receive the lower portion of the tire, as 29, when the latter is in substantially vertical stored position flanking the wall 16, 17 of the compartment as indicated in Figs. 1 and 3.

Figure 2:
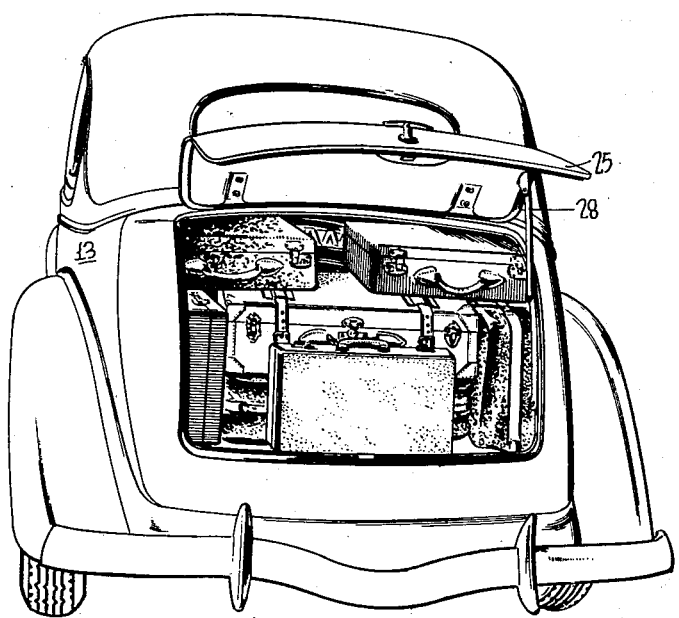
Fig. 2 is a similar view of an automobile equipped with the invention showing the compartment loaded with baggage.

It will be clear by reference to Figs. 1 and 3 that when the cover 25 is in the raised position as shown in Fig. 1, the spare tire 29 which in this instance is shown mounted on the spare wheel 30 can be readily brought into position by first sliding its lower portion into the well 28, the upper portion of which is for this purpose widened at 28a, and by then swinging the upper portion of the tire forwardly around the lower portion as a fulcrum and against the rear seat wall 17. The removal of the tire is, of course, achieved by the opposite procedure.

When in this storage position it is secured in place by any suitable means such as the eye bolt 31 secured centrally to the cross member 18 of the rear seat structure and the hook bolt 32 passing through the center of the wheel 30 carrying the spare tire 29, the wheel and tire being held in place by a spider 32' slipping over the hook bolt 32 and drawn against the bolting-on flange of the wheel surrounding its central opening by a wing nut 33.

By reference to the drawings, it will be seen that the tire located in this position provides a wide storage space on each side thereof between its sides and the wheel housing portions 22 of the side walls, a space amply wide to readily receive a luggage bag as 34. The bag can be readily brought into position into this space by sliding it forwardly along the floor 21 of the compartment. The extreme roominess provided by this arrangement of the spare tire in substantially upright position and in flanking relation to the one wall of the compartment is readily apparent from the various views, Fig. 2 in particular giving a graphic illustration of the spaciousness by the number of pieces of luggage shown stored in this space.

Even where the trunk housing projection from the rear wall of the body is not present, and the lower portion of rear wall is extended down at the same inclination as the upper as indicated by the dot and dash line 35, see Fig. 3, the compartment still has ample room for the storage of the spare tire and a number of pieces of luggage and thus attains in substantial degree the objects of the invention.

The space in the rear of the gasoline tank may be additionally utilized by forming a downwardly projecting box 36 in the floor plate 21 which box may serve as a tool box, thus located in a readily accessible position. The top of this tool box may normally be closed by removable floor board 37 flush with the flooring plate 21.

As shown in Figs. 1 and 3 the well portion 28 of the flooring may be made as a separate stamping flanged in its edges and secured through its edge flanges as by welding to the margin of an opening provided in the floor plate 21. The rear margin of this separate stamping may form with the floor plate a box section to stiffen the floor in this region as indicated at 38 of Fig. 3.

From the foregoing description it will be readily apparent that I have provided a new and novel arrangement of luggage and spare tire compartment which is very easy of access and which provides a maximum of space for storage, it will be understood that the specific form shown and described is capable of extensive variation and modification all within the skill of those skilled in this art, and it is my purpose in the following claims to claim the invention broadly to bring all such variations and modifications within the scope of the claims.

What is claimed is:

1. A closed pleasure car body of conventional lines having a built-in storage compartment in rear of the rear seat back, said storage compartment being closed at the front by the rear seat back, at the bottom by the floor panel relatively flat in its main portion and raised a substantial distance above the lower margins of the side walls of the body, at the sides by portions of the body side walls and at the rear by a portion of the body rear wall, said floor panel being provided at the front of said compartment with a transversely extending well the bottom of which is depressed below the level of the main portion of the floor panel and arranged to receive a spare tire in said compartment disposed in upright position flanking the rear seat back, whereby a maximum of luggage storage space is provided laterally and rearwardly of a tire disposed in said well, said storage space being achieved without reducing the normal passenger space within the body and without extending the body walls rearwardly beyond conventional lines.

2. A closed pleasure car body of conventional lines having a downwardly and rearwardly inclined rear wall and having a built-in storage compartment forwardly of said wall, the front wall of said compartment being formed by a seat back disposed forwardly of the rear body wall, the front portion of the top wall of said compartment connecting said rear wall at about the belt line with the rear seat back near the top thereof, the bottom of said compartment being arranged above the lower margins of the body side and rear walls and being provided in its forward portion with a transverse well depressed below the level of the main portion of the floor and adapted to receive the lower portion of a spare tire, whereby the spare tire may be received within the compartment in substantially upright position flanking the seat back with its bottom portion arranged in the well and its top portion arranged forwardly of the inclined rear wall of the body and whereby a maximum luggage storage space is provided laterally and rearwardly of said tire without encroaching upon the normal passenger space and without extending the conventional lines of the body rearwardly.

3. In an automobile body comprising side walls and an upright transverse structure arranged between said side walls and separating a passenger compartment from a luggage compartment, said luggage compartment being defined additionally by a substantially horizontal bottom wall and a substantially horizontal top wall and furthermore by a transverse body end wall, said body end wall being provided with an opening giving access to said luggage compartment, the length of said luggage compartment at the bottom between said end wall and said transverse structure being in the longitudinal direction of the automobile several times, the thickness of a spare tire, the height of the luggage compartment between the main portions of said bottom wall and said top wall being less than the diameter of a spare tire, at least one of these horizontal walls being provided with an outward bulge adjacent the transverse wall structure so as to increase the height in the region of this bulge to at least the diameter of a spare tire, means for fastening a spare tire in the region of said bulge substantially flatly against said transverse structure, whereby with the spare tire arranged in the region of said bulge a maximum of luggage storage space extending unobstructedly from the main portion of the bottom wall to the top of the luggage compartment is provided laterally and rearwardly of such a spare tire, said storage space being adapted to accommodate several large suitcases and a plurality of smaller pieces of luggage.

4. A closed pleasure car body having a built-in storage compartment in the rear of the passenger compartment, said storage compartment being defined at the front by a transverse upright structure, at the bottom by a floor panel comprising a relatively flat main portion, at the sides by portions of the body side walls, at the rear by a rear wall and at the top by a substantially horizontal wall structure which is joined to said side wall portions and to the upper portion of said transverse structure, the height of said compartment between the main portions of the floor panel and of the wall structure at the top being less than the diameter of a spare tire of the car, said floor panel being provided at the front of said compartment with a transversely extending well the bottom of which is depressed below the level of the floor panel and adapted to receive a spare tire in said compartment disposed in upright position flanking said transverse structure, whereby a maximum of luggage storage space is provided laterally and rearwardly of a tire disposed in said well, said well being adapted to allow a spare tire to be brought into position by first sliding its lower portion into the well, and then swinging the upper portion around the lower portion as a fulcrum and against the transversely extending wall.

CLARKE P. POND.